(12) United States Patent
Peiker

(10) Patent No.: US 7,283,849 B2
(45) Date of Patent: Oct. 16, 2007

(54) ASSEMBLY COMPRISING A MOBILE TELEPHONE

(76) Inventor: Andreas Peiker, Max-Planck-Strasse 32, Friedrichsdorf (DE)

( * ) Notice: Subject to any disclaimer, the term of this patent is extended or adjusted under 35 U.S.C. 154(b) by 407 days.

(21) Appl. No.: 10/466,624

(22) PCT Filed: Jan. 18, 2002

(86) PCT No.: PCT/DE02/00146

§ 371 (c)(1),
(2), (4) Date: Jul. 18, 2003

(87) PCT Pub. No.: WO02/058408

PCT Pub. Date: Jul. 25, 2002

(65) Prior Publication Data

US 2004/0058704 A1 Mar. 25, 2004

(30) Foreign Application Priority Data

Jan. 18, 2001 (DE) .............................. 101 02 277
Apr. 20, 2001 (DE) .............................. 101 19 655

(51) Int. Cl.
*H04M 1/00* (2006.01)
(52) U.S. Cl. .................... 455/569.2; 455/557; 455/573
(58) Field of Classification Search ............... 455/41.1, 455/569.1, 557, 552.1, 554.2, 556, 79, 563, 455/573, 569.2
See application file for complete search history.

(56) References Cited

U.S. PATENT DOCUMENTS

| | | |
|---|---|---|
| 4,972,470 A | 11/1990 | Farago |
| 5,095,541 A | 3/1992 | Aisaka et al. |
| 5,353,334 A | 10/1994 | O'Sullivan |
| 5,479,479 A * | 12/1995 | Braitberg et al. ......... 455/404.1 |
| 5,822,427 A | 10/1998 | Braitberg et al. |
| 6,341,218 B1 * | 1/2002 | Poplawsky et al. ...... 455/569.1 |
| 6,377,825 B1 * | 4/2002 | Kennedy et al. .......... 455/569.2 |
| 6,532,374 B1 * | 3/2003 | Chennakeshu et al. .. 455/569.1 |
| 6,697,638 B1 * | 2/2004 | Larsson et al. ........... 455/553.1 |
| 6,792,295 B1 * | 9/2004 | Hanevich et al. ......... 455/569.1 |
| 2002/0034971 A1 * | 3/2002 | Chang et al. ............... 455/569 |

FOREIGN PATENT DOCUMENTS

| | | |
|---|---|---|
| DE | 42 92 401 | 7/1992 |
| DE | 43 00 848 | 8/1993 |
| DE | 295 20 231 U1 | 3/1996 |
| DE | 296 14 668 | 1/1997 |
| DE | 296 16 889 | 3/1997 |

(Continued)

OTHER PUBLICATIONS

Bury-Zeichnung UNI-Sub D Halterplatine für Nokia (Artikel Nr. 08.10.0105.0) vom Jul. 27, 2000.

(Continued)

*Primary Examiner*—Edward F. Urban
*Assistant Examiner*—Tux X. Nguyen
(74) *Attorney, Agent, or Firm*—Burr & Brown

(57) ABSTRACT

An arrangement including a base station, an adapter coupled to the base station, and a mobile telephone coupled to the adapter. The adapter carries out information matching between the base station and the mobile telephone, including electrical and protocol matching between the mobile telephone and the base station.

15 Claims, 4 Drawing Sheets

FOREIGN PATENT DOCUMENTS

| | | |
|---|---|---|
| DE | 297 04 395 | 6/1997 |
| DE | 196 31 444 | 8/1998 |
| DE | 197 04 992 A1 | 8/1998 |
| DE | 197 15 596 | 10/1998 |
| DE | 197 15 596 A1 | 10/1998 |
| DE | 197 17 237 | 10/1998 |
| DE | 198 50 044 | 10/1998 |
| DE | 299 03 958 U1 | 7/1999 |
| DE | 299 07 072 | 8/1999 |
| DE | 299 07 072 U1 | 8/1999 |
| DE | 299 10 287 | 9/1999 |
| DE | 198 35 017 | 2/2000 |
| DE | 198 35 017 C2 | 2/2000 |
| DE | 299 19 581 U1 | 2/2000 |
| DE | 198 39 685 | 3/2000 |
| DE | 299 18 830 | 4/2000 |
| DE | 200 15 036 U | 11/2000 |
| DE | 200 11 311 U1 | 12/2000 |
| DE | 200 15 036 | 1/2001 |
| DE | 299 12 359 | 2/2001 |
| EP | 0 309 627 | 4/1989 |
| EP | 0 449 471 | 10/1991 |
| EP | 0 494 780 | 7/1992 |
| EP | 0 559 187 | 9/1993 |
| EP | 0 641 088 | 3/1995 |
| EP | 0 760 188 | 3/1997 |
| EP | 0 831 667 | 3/1998 |
| EP | 0 831 667 A | 3/1998 |
| EP | 0 932 142 | 7/1999 |
| EP | 1 266 456 | 12/2002 |
| WO | 94/09586 | 4/1994 |
| WO | 94/24775 | 10/1994 |
| WO | WO95/28789 A1 | 10/1995 |
| WO | WO97/00792 A1 | 1/1997 |
| WO | 97/33384 | 9/1997 |
| WO | WO98 11747 A | 3/1998 |
| WO | 98/42537 | 10/1998 |
| WO | 98/59425 | 12/1998 |
| WO | 01/41484 | 6/2001 |
| WO | 01/61875 | 8/2001 |
| WO | WO 01/61875 A1 | 8/2001 |

OTHER PUBLICATIONS

Bury-Zeichnung UNI-Stecker für Siemens X25 & C28 (Artikel Nr. 08.10.0111.0) vom Jul. 7, 2000.

THB Bury Germany Mobilfunk Equipment, No. 72100619, Dec. 10, 2001.

DPD, 209980, Jan. 16, 2001.

THB Bury Germany Mobilfunk Equipment, No. 62100143, Mar. 1, 2001.

"DAS Original" BauPlan, pp. 84-86.

* cited by examiner

ASSEMBLY COMPRISING A MOBILE TELEPHONE

CROSS REFERENCE TO RELATED APPLICATIONS

This application is a National Stage Application of International Application No. PCT/DE02/00146, filed on Jan. 18, 2002, which claims priority to German Application No. 101 02 277.8, filed on Jan. 18, 2001.

BACKGROUND OF THE INVENTION

1. Field of the Invention

The invention relates to an arrangement with a mobile phone.

2. Related Art

An arrangement with a mobile telephone is disclosed in WO 95/28789. This arrangement comprises a base station, an adapter and a mobile telephone, with the base station and the adapter being connected via a cable, and the mobile telephone being plugged into the adapter. Depending on the type of mobile telephone that is connected, and which is identified by the base station, for example, by means of an identification unit which is arranged in the adapter, this unit sets a large number of operating parameters for use of the mobile telephone which is connected to the adapter. An arrangement such as this has the disadvantage that, when the mobile part is identified by means of a contact that is made or by means of an associated number produced by contact links, the base station is suitable only for mobile telephones whose technical data is known at the time that the base station is produced. This means that the base station is not suitable for newly marketed mobile telephones. Even the use of a memory element in an identification unit which is arranged in the adapter and which transmits identifying data to the base station does not completely overcome the problem of what is referred to as upward compatibility since this does not allow the technical data or the technical performance of the base station to be changed, either. Thus, by way of example, a new type of mobile telephone which requires a charging voltage which cannot be provided by the base station cannot be charged.

A further disadvantage of the known arrangement, which will also be of particular interest to those who are referred to as fleet operators, is the complex and hence expensive design of the base station since, in fact, this component would need to be provided in every vehicle.

WO 98 11747 A has disclosed another arrangement with a mobile telephone. In this case, two or more subscriber stations with a hand-held radio telephone and base stations can communicate with one another or with a central communication device, preferably in a large volume vehicle, with the communication device itself providing the connection to a station outside the vehicle. A central computer coordinates the respective telephoning devices with the radio network, including additional functions.

Such an arrangement does not provide matching for different mobile telephones to a universal base station.

A similar device has been disclosed in EP 0 831 667 A1.

Finally, DE 200 15 036 U1 has disclosed a mobile receiving device for use in a drinks holder in a vehicle, in which the hands-free device is completely integrated in the receiving device. The mobile hands-free device has no further associated base station.

OBJECTS OF THE INVENTION

It is an object of the invention to provide an arrangement which can be used for any desired mobile telephone and has a simple, low-cost base station.

SUMMARY OF THE INVENTION

This and other objects of the invention object can be achieved by an arrangement including a base station, an adapter coupled to the base station, and a mobile telephone coupled to the adapter. The adapter carries out information matching between the base station and the mobile telephone, including electrical and protocol matching between the mobile telephone and the base station.

In an arrangement according to the invention, the adapter contains electronics which are aligned with the mobile telephone and with the base station and provide matching of the electrical information coming from the mobile telephone to the base station, and matching of the electrical information coming from the base station to the mobile telephone. In this case, the expression electrical information means information such as charging voltage, charge impulse duration, speech signals, received signals, transmission signals and outgoing and incoming control signals. The basic idea of this arrangement is that a universal base station which is arranged in the vehicle can be combined with any radio telephone on the market and with any radio telephone which may be marketed in the future, without any change being necessary to the base station. This is achieved by an adapter which, by matching to the form of the radio telephone and matching to the arrangement of the electrical contacts in the interface of the radio telephone, actively becomes involved, by means of the electronics, in the dialogue between the mobile telephone and the base station, or other assemblies which are arranged in the vehicle. The adapter, which is in the form of a holding shell or a receptacle for the mobile telephone, makes it possible to match any type of intelligence in the radio telephone to the level of the base station. Owing to the fact that the base station in an arrangement such as this need not have any matching capability, it can be designed as a simple, low-cost component. This provides a major stimulus to accommodation of the base station as a standard component or mass-produced component in vehicles, thus allowing the customer with a complete range of freedom of choice of a mobile telephone, since this only requires a matching adapter shell and does not itself need to initiate or carry out any complex installations and conversions. Even customers who change to newer mobile telephones after some time have no need to replace the base station, since an adapter which is matched to the new mobile telephone carries out any necessary matching. This saves resources, and there is no need for any complex and tedious conversion work in the vehicle.

One advantageous embodiment of the subject matter of the invention provides for speech signal processing to be integrated in the base station, in particular with the capability to carry out echo cancellation and/or noise suppression and/or signal amplification electronically. In particular, this allows convenient use of a hands-free device connected via the base station. Speech signal processing, which also includes speech signal recognition, allows speech control of the mobile telephone via the base station or at least one microphone that is arranged in the vehicle.

It is also advantageous to equip the base station with an interface to the adapter, and for the interface to be equipped with a controller for the network in the vehicle and/or a controller for the mobile telephone. This allows the protocol modules which are arranged in the adapter to emit and receive electrical information via the interface connection between the adapter and the base station.

The invention also proposes that the adapter have a module for matching the levels of the speech signals to the base station. This makes it possible for the adapter to match the level of the speech signals which originates from the base station and are detected, for example, by the microphone of the handle-free device to the level required for the mobile telephone. Conversely, the adapter is also able to match the level of the speech signals originating from the mobile telephone, for example of a speech signal which is passed to the loudspeaker of the hands-free device, to the requirements of the base station, so that these signals can be processed optimally by the respective device.

One expedient refinement of the subject matter of the invention provides protocol modules in the adapter for the network in the vehicle and the mobile telephone, in addition to which an initialization routine is also provided for matching to the databus of the mobile telephone. These modules ensure that the base station and mobile telephone are matched to one another.

A charger for the battery in the mobile radio telephone is advantageously provided in the adapter and is supplied from the base station. This also makes it possible to charge mobile radio telephones which require a higher charging voltage than the supply voltage produced by the base station, since the charger which is arranged in the adapter transforms the voltage up if necessary. Furthermore, this also allows new types of batteries or accumulators to be charged which require charging pulses which cannot be produced by the base station but can be generated by the charger arranged in the adapter.

Finally, a further embodiment of the subject matter of the invention provides for the interfaces between the individual components of the arrangement to be produced by means of cables and plugs and/or by direct contact and/or by radio links. This is also in particular intended to cover, for example, providing the power supply by means of cables and plugs or contacts, and providing the speech and data interfaces via a radio link by means of infrared or electromagnetic waves (Bluetooth).

Another embodiment of the invention provides for the base station and/or the adapter unit to be equipped with a replaceable memory medium, which is designed for storing user-specific functions such as hands-free operation and/or speech recognition and/or position finding and/or individual traffic management. This makes it possible to make desired functions available in the arrangement retrospectively, or to replace existing functions by other, extended or improved functions. The base station and the adapter unit can be extended by this capability such that they can be updated and are modular. Furthermore, individual functions can also be interchanged easily between different vehicles with the same base stations and adapter units.

The invention also provides for the memory medium to provide a function which makes it possible to use user-specific functions which are already provided in the mobile telephone for operation of the mobile telephone in a vehicle as well. This refers, for example, to the use of speech recognition or noise cancellation that is provided in the mobile telephone for operation of the mobile telephone in a vehicle, with the memory medium providing a function which carries out the communication with and the matching to the existing function. This avoids the complexity of duplicated provision of functions which are required in the vehicle and outside the vehicle.

The invention also provides for the memory medium to be in the form of a removable and/or rewritable memory medium. The use of a memory medium which is in the form of a memory board or plug-in module or SIM card makes it particularly simple for the user to handle the memory medium.

The use of a memory medium which can be rewritten via a radio link also makes it possible to record further or changed functions when it is plugged in.

Finally, the invention provides for the memory medium to be used as a pure data storage medium for functions which are already available in the arrangement. For example, this covers provision for use of the storage medium as a data storage medium for an extended dictionary for text and speech conversion. The functional scope of the mobile telephone can thus be extended for specific use in a vehicle.

BRIEF DESCRIPTION OF THE DRAWINGS

Further details of the invention are described with reference to schematically illustrated exemplary embodiments in the drawing, in which.

DETAILED DESCRIPTION OF THE INVENTION

Figure 1:
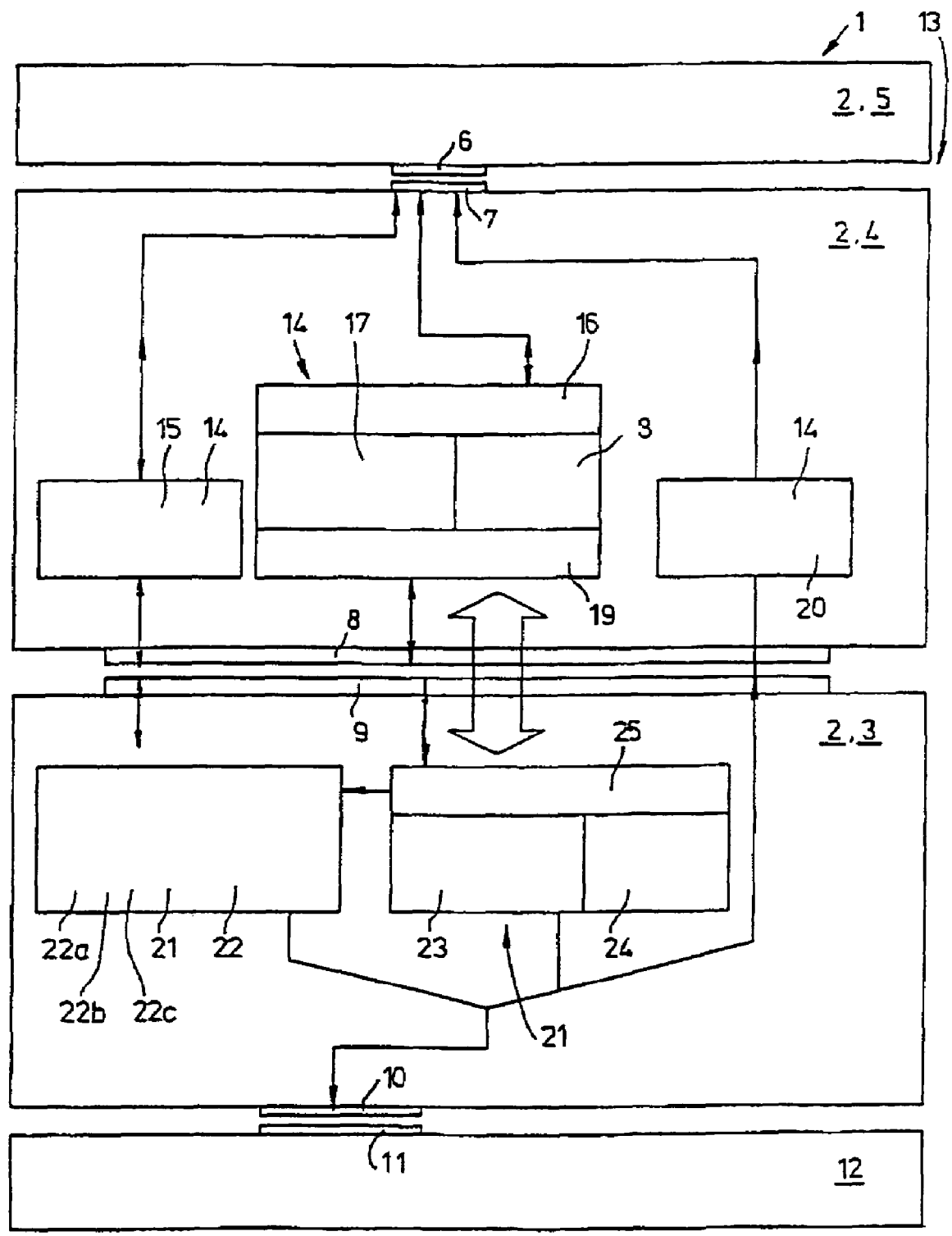
FIG. 1 shows a schematic illustration of the arrangement according to the invention.

FIG. 1 shows an arrangement 1, schematically. The arrangement 1 comprises three components 2, which are in the form of a base station 3, an adapter 4 and a mobile telephone 5. The mobile telephone 5 has an interface 6, via which it is connected to a first interface 7 of the adapter 4. The adapter 4 is connected via a second interface 8 to a first interface 9 of the base station 3. This has a second interface 10, via which a connection can be made to an interface 11 in a vehicle 12 in which the arrangement 1 is installed. The connection between the interfaces 6 and 7 is made via plug and/or spring contacts, which are not shown. According to one embodiment variant, which is not illustrated, an infrared link or what is referred to as a Bluetooth link is also provided. Modules 14 for matching the mobile telephone 5 to the base station 3 and for matching the base station 3 to the mobile telephone 5 are arranged in the adapter 4 which, together with the mobile telephone 5, forms an adapted telephone unit 13. These modules 14 comprise an electronic device 15 (audio adaption) for matching the levels of the speech signals, which are transmitted from the mobile telephone 5 via the adapter 4 to the base station 3, and which are transmitted from the base station 3 via the adapter 4 to the mobile telephone 5. A further module 14 comprises an initialization module 16 (initialization routine), a protocol module 17 (vehicle network protocol module) for the network in the vehicle 12, a protocol module 18 (telephone protocol module) which carries out the conversion of the electronic information for the mobile telephone 5, and a common interface 19 (application program interface), which is connected to the interface 8. The initialization module carries out the initialization of the databus for the mobile telephone to the adapter 4. Furthermore, the adapter 4 has a module 14, which is in the form of a charger 20 (battery charger). All the modules 14 are connected both to the interface 7 and to the interface 8 of the adapter 4. To this extent, the adapter 4 operates as a switching, conversion and transmission unit. Further modules 21 are arranged in the base station 3. These modules include speech signal processing 22 which, by way of example, carries out echo cancellation 22a and/or noise suppression 22b and/or acts as an amplifier 22c. A further module 21 comprises a controller 23 (vehicle network controller) for the network in the vehicle 12, a controller 24 (telephone controller), which operates in parallel with the controller 23, for the mobile telephone 2 and an interface 25 (application program interface), via which both controller 23, 24 [lacuna] connected to the interface 9. Data is interchanged between the modules 14, 21 via the interfaces 8, 9, which can be connected in the same way as the interfaces 6, 7. A power supply for the charger 20 is also provided via the interfaces 8, 9.

Figure 2:
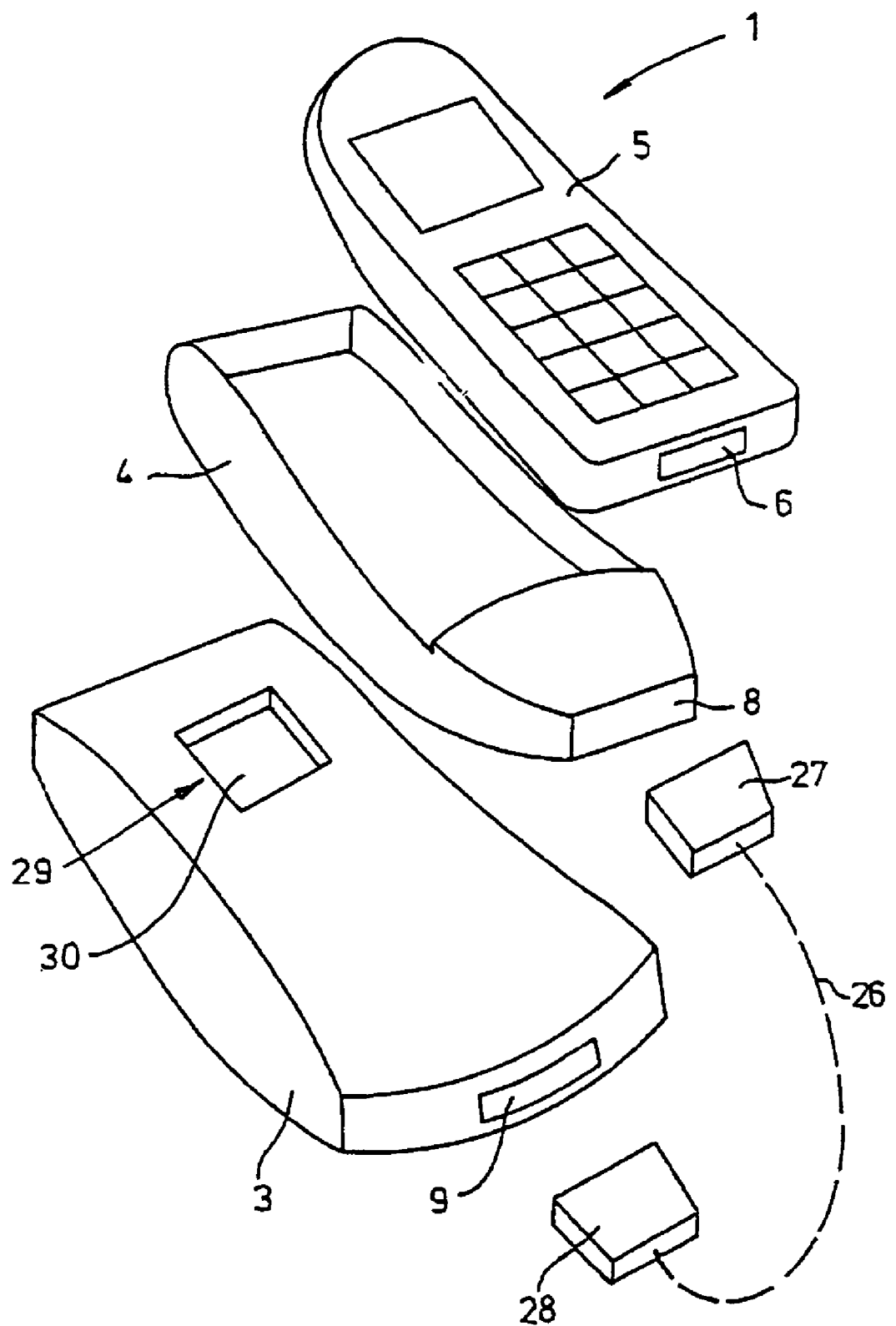
FIG. 2 shows a perspective illustration of one possible embodiment of the arrangement.

FIG. 2 shows one embodiment of the arrangement 1, illustrated in perspective. The base station 3 and the adapter 4 are connected to plugs 27, 28 at the interfaces 8, 9 via a cable 26. The connection between the adapter 4 and the mobile telephone 5 is provided by direct contact between the interface 6 of the mobile telephone 5 and the interface 7 (see FIG. 1) of the adapter 4. The adapter 4 can be fixed to a recess 29 in the mobile part 5, in which a magnet 30 is arranged.

Figure 3:
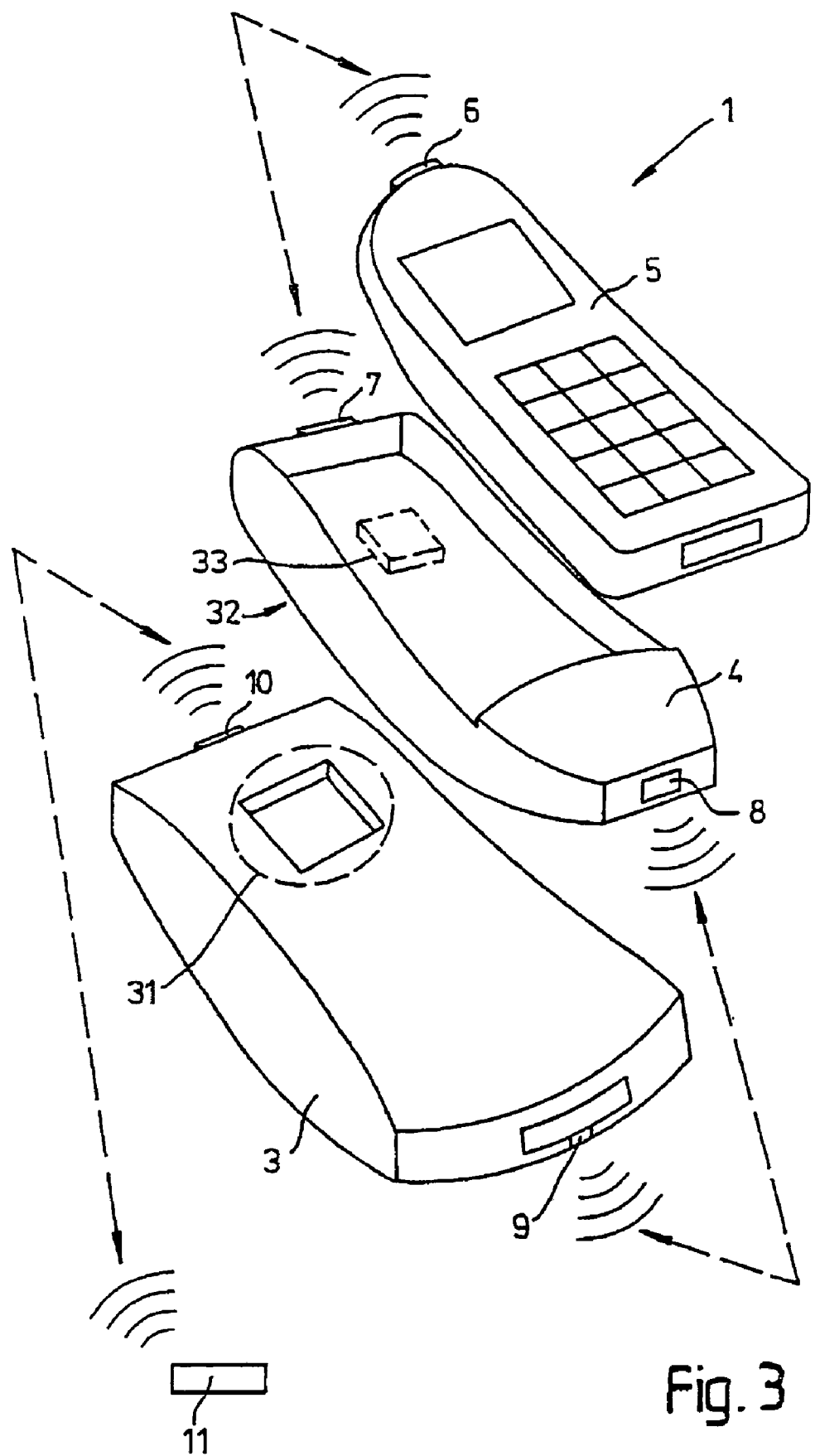
FIG. 3 shows a perspective illustration of a further possible embodiment of the arrangement.

FIG. 3 shows a perspective illustration of a further possible embodiment of the arrangement 1. The mobile telephone 5 is connected without the use of wires via the interface 6 to the interface 7 of the adapter 4, with the interfaces 6, 7 being in the form of transmission and/or reception interfaces for infrared or electromagnetic waves. The connection of the adapter 4 to the mobile telephone 5 without the use of wires allows the mobile telephone 5 also to be removed from the adapter during operation. It is likewise possible to take the mobile telephone 5 off the base station 3 together with the adapter 4, in which case either the charging of an energy source contained in the mobile telephone is then interrupted, or charging takes place via an energy source which is accommodated in the adapter. The communication between the adapter 4 and the base station 3 via the interfaces 8, 9 is likewise cordless, via infrared or electromagnetic radio waves. A transmission coil 31 is provided in the base station in order to transmit energy from the base station 3 to the adapter 4, and a receiver coil 33, which is provided on a lower face 32 of the adapter 4, enters this transmission coil 31 when the adapter 4 is placed on the mobile telephone 5. In order to configure the installation of the arrangement 1 in the vehicle to be as simple as possible, the base station 3 is connected via the interface 10 to the interface 11 in the vehicle without the use of wires. The energy supply for the arrangement 1 or the base station 3 is provided by a power supply cable that is not illustrated, or by means of induction.

Figure 4:
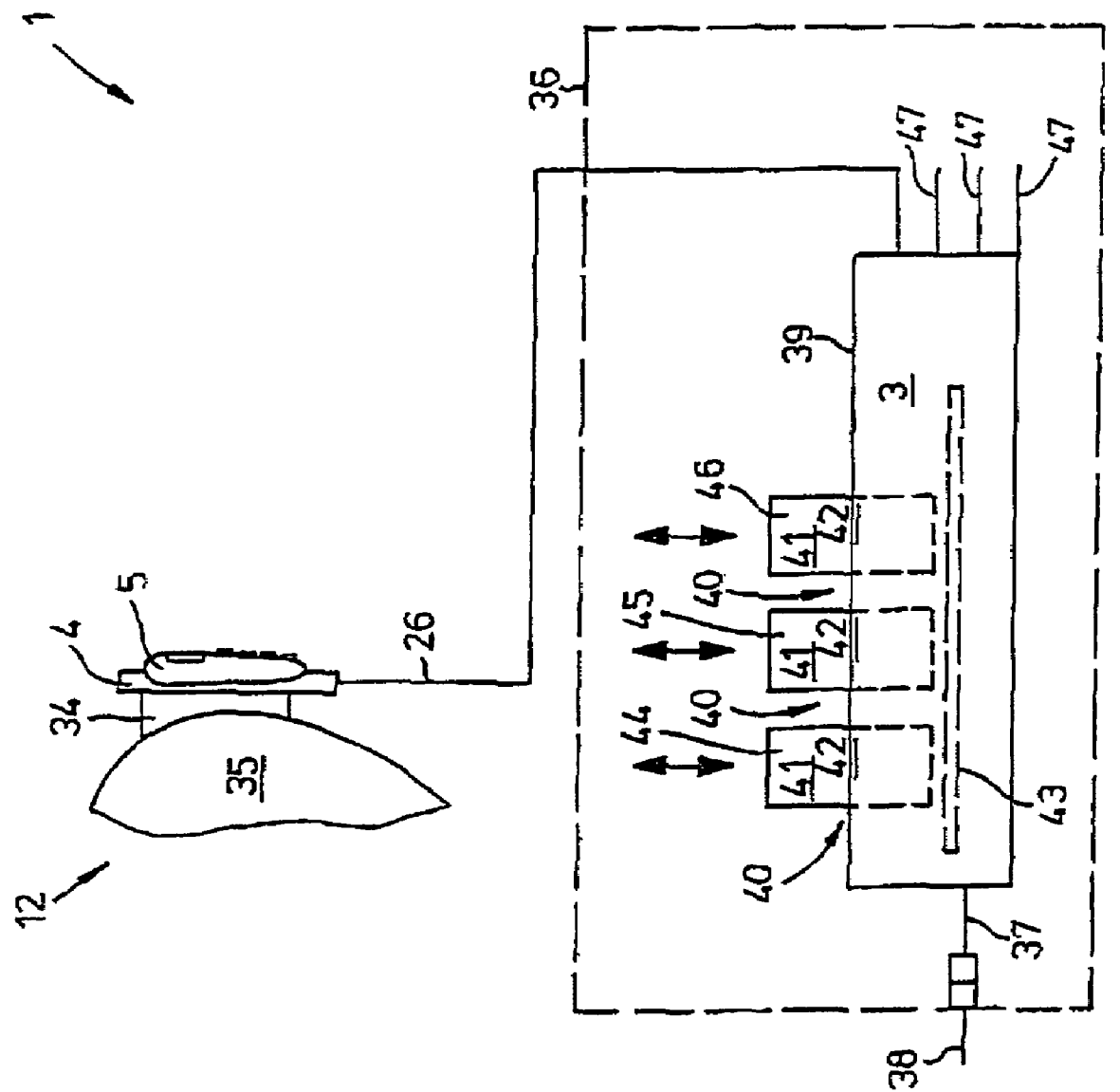
FIG. 4 shows a schematic illustration of a third possible embodiment of the arrangement.

FIG. 4 shows a schematic, simplified illustration of a third possible embodiment of the arrangement 1. The mobile telephone 5 is held in the adapter 4. The adapter 4 is mounted by means of a holder 34 on the dashboard 35 of a vehicle 12. The adapter 4 is connected to the base station 3 via the cable 26. The base station 3 is arranged in a stowage space 36 in the vehicle 12. Further electronic components such as a CD disk drive, which are not shown, are arranged in this stowage space 36. The base station 3 is connected to the vehicle's own bus system 38 via a connection 37. A housing 39 for the base station 3 has recesses 40, into which memory media 41 are plugged. The memory media 41 are in the form of plug-in modules 42, which make electrical contact with a board 43 that is arranged in the base station 3. A speech recognition module 44, an echo cancellation module 45 and a freely programmable function module 46 are plugged into the base station 3. The microphone and loudspeaker are connected via contacts 47 or via the vehicle's own bus system 38. According to one embodiment variant, which is not illustrated, provision is made for the base station itself to be in the form of a plug-in module or plug-in board, which can be plugged into a plug-in slot that is connected to the vehicle's own bus system. Provision is also made for the plug-in modules for speech recognition etc. to be placed in plug-in slots which are part of the vehicle's own bus system and which can set up a connection between these plug-in modules and the base station via the vehicle's own bus system.

The invention is not restricted to the illustrated or described exemplary embodiments. In fact, it covers developments of the invention in the context of the patent claims. In particular, the invention also provides for a speech recognition module to be accommodated in the adapter, so that the base station is still restricted to essential components and modules.

According to a further embodiment variant, provision is made for the base station to contain an internal loudspeaker and an internal microphone to provide a hands-free system, in order to keep the installation complexity for the base station in the vehicle as low as possible.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

The invention claimed is:

1. An arrangement for use in a motor vehicle, comprising a base station, an adapter, and a mobile telephone, all electronically interconnected with one another, said base station comprising two interfaces and a module having a first controller that interfaces with a network in the motor vehicle and a second controller that operates in parallel with the first controller for interacting with the mobile telephone, said adapter comprising two interfaces and at least one module for adapting the mobile telephone to the base station and for adapting the base station to the mobile telephone, wherein said base station is universal in that it can be used with a variety of different mobile telephones, and wherein said adapter is specifically matched with a particular mobile telephone and carries out matching of information between said base station and the particular mobile telephone and also carries out electrical and protocol matching between the particular mobile telephone and said base station, and wherein said adapter and said base station communicate wirelessly through their respective interfaces via electromagnetic radio waves and said mobile telephone and said adapter communicate wirelessly through their respective interfaces via electromagnetic radio waves.

2. The arrangement as claimed in claim 1, wherein the base station further comprises a module for processing speech signals, including at least one of echo cancellation, noise suppression, and signal amplification.

3. The arrangement as claimed in claim 1, further comprising:
- an interface coupled to the base station for interfacing with the adapter;
- a vehicle network controller coupled to the base station; and
- a mobile telephone controller coupled to the base station, wherein the interface is further coupled to at least one of the vehicle network controller and the mobile telephone controller.

4. The arrangement as claimed in claim 2, the adapter further including a module for matching a level of the speech signals to the base station.

5. The arrangement as claimed in claim 1, wherein the mobile telephone further includes a databus and wherein the adapter further includes an interface to the base station, the interface including at least one of a vehicle network protocol module and a mobile telephone protocol module, and an initialization module for matching to the databus.

6. The arrangement as claimed in claim 1, wherein the adapter further includes a charger operable as an energy source for the mobile telephone.

7. The arrangement as claimed in claim 1, wherein the base station is coupled to the adapter via at least one of a cable, a radio link, infrared, and Bluetooth.

8. The arrangement as claimed in claim 1, further comprising:
- a memory medium coupled to at least one of the base station and the adapter unit for storing user-specific functions including at least one of hands-free operation, connection to a vehicle bus, noise cancellation, echo cancellation, speech recognition, text conversion to speech, and speech conversion to text.

9. The arrangement as claimed in claim 8, wherein the memory medium provides user-specific functions which are available in the mobile telephone, including at least one of speech recognition, noise cancellation, and echo cancellation for operation of the mobile telephone.

10. The arrangement as claimed in claim 8, wherein the memory medium comprises at least one of a removable and rewritable memory medium.

11. The arrangement as claimed in claim 8, wherein the memory medium is rewritable via a radio link.

12. The arrangement as claimed in claim 8, wherein the memory medium holds supplementary data for user-specific functions for at least one of the mobile telephone, the base station, and the adapter, and wherein the supplementary data includes an extended dictionary for text conversion to speech and/or speech conversion to text.

13. The arrangement as claimed in claim 10, wherein the memory medium is at least one of a memory board and a plug-in module.

14. An arrangement for use in a motor vehicle, comprising a base station, an adapter, and a mobile telephone, all electronically interconnected with one another, said base station comprising two interfaces and a module having a first controller that interfaces with a network in the motor vehicle and a second controller that operates in parallel with the first controller for interfacing with the mobile telephone, said adapter comprising two interfaces and at least one module for adapting the mobile telephone to the base station and for adapting the base station to the mobile telephone,
- wherein said base station is universal in that it can be used with a variety of different mobile telephones, and wherein said adapter is specifically matched with a particular mobile telephone and carries out matching of information between said base station and the particular mobile telephone and also carries out electrical and protocol matching between the particular mobile telephone and said base station, and wherein said adapter and said base station communicate wirelessly through their respective interfaces via electromagnetic radio waves and said base station supplies energy to said adapter by induction.

15. The arrangement as claimed in claim 1, wherein the adapter further comprises an energy source to charge the mobile phone when the adapter is removed from the base station.

* * * * *